UNITED STATES PATENT OFFICE.

ANTON SLADOSLAWEK, OF CHICAGO, ILLINOIS.

ARTIFICIAL STONE.

SPECIFICATION forming part of Letters Patent No. 488,682, dated December 27, 1892.

Application filed April 21, 1892. Serial No. 430,126. (No specimens.)

*To all whom it may concern:*

Be it known that I, ANTON SLADOSLAWEK, a subject of the Emperor of Austria-Hungary, residing at Chicago, in the county of Cook and State of Illinois, have invented a new and useful Improvement in Artificial Stone, of which the following is a specification.

My invention relates to an improvement in artificial stone, and is more particularly directed to the production of tile and other ornamental material.

The primary object of my invention is to produce an artificial stone from chips combined with a cement in such a manner that the cement shall have an inherent hardness equal to the hardness of the introduced chips, which may be of marble, granite, gravel, sand, or the like.

A further object of my invention is to produce an artificial stone which shall be capable of taking a high polish.

My invention consists primarily in a certain composition which when pressed and allowed to harden will have a hardness uniform throughout the stone.

My invention further consists in the composition which I prefer to employ to give to the artificial stone the quality of taking a high polish.

Artificial stone in the form of a cement containing chips of marble, gravel, granite, or the like, has heretofore been produced, but so far as I am aware all such products have been objectionable, because of the difference in hardness between the introduced chips and the cement, so that the wearing away of the cement takes place between the chips, the product becoming very soon rough and unsightly. This wearing may be due to atmospheric action, to the action of water or to other causes, but however it occurs it destroys in large measure the usefulness and ornamental character of the product. To overcome this objection I proceed as follows: I produce a combination of Portland or other suitable cement with the chips of marble, granite, or the like, in about the proportion of one-third cement and two-thirds of chips, although this proportion may be varied. To this mass I add saltpeter dissolved in water together with a small quantity of powdered magnesia. The mass thus obtained is mixed with lime water in proportion of about one part of lime water to four parts of the mass, although this proportion may be varied. While this mass so obtained is plastic it is pressed into any form desired and permitted to dry, whereupon an artificial stone is obtained in which the cement part is hard or soft in accordance with the proportion of saltpeter added. The amount of saltpeter to be added will vary according to the hardness of the chips, the maximum being added with granite chips and a less proportion with chips of marble. Whatever wear may take place upon the artificial stone thus produced will be uniform throughout the surface. The magnesia which has been added in very small quantity is only for the purpose of giving to the stone the property of taking a high polish, and may be omitted if this property is not desired. To give color to the product any desirable pigmentary color may be added in the usual manner.

It is peculiar of the stone produced from the foregoing composition that it increases in hardness with age and the ultimate hardness may, as before stated, be regulated by the proportion of saltpeter added. If there shall be any irregularities on the surface when the plastic mass has been compressed into form and usually after polishing the surface may be filled out with a composition composed of beeswax, rosin and marble dust in about equal proportions or otherwise, the last-named composition being also of a character to take a polish when properly performed.

In addition to saltpeter, shellac may be employed with the result of bringing about the necessary hardness in less time, but the shellac is much more expensive and is not preferable.

To produce a polish on the artificial stone composed as above I prefer to proceed as follows: I first grind the surface in the ordinary manner to produce substantial evenness, and then I grind the same with pumice-stone, and then with emery powder applied with a rubber of lead foil; the surface is then rubbed hard with a mixture of emery and shellac, called emery-stone, and finally the surface is rubbed hard with a mixture of broken sulphur, clover salt and English vermilion, although the English vermilion may be omitted. It is preferable to delay the polishing until the artificial stone has been allowed to harden considerably, so that the cement portion shall be substantially as hard as the introduced chips.

What I claim as new and desire to secure by Letters Patent is—

1. A composition for producing artificial stone, comprising Portland cement, chips, lime water and saltpeter, substantially as described.

2. The composition for artificial stone, comprising Portland cement, chips, lime water, saltpeter and magnesia, combined, substantially as described.

3. The process of producing an artificial stone, which consists in first mixing cement and chips in proper proportion, then adding thereto a mixture of dissolved saltpeter and magnesia, adding to the mass obtained lime water, pressing and drying, substantially as described.

ANTON SLADOSLAWEK.

In presence of—
M. J. FROST,
J. N. HANSON.